United States Patent [19]

Myers

[11] Patent Number: 5,215,241
[45] Date of Patent: Jun. 1, 1993

[54] COMPOSITE SOLDERING IRON TIP USING HEAT OF FUSION

[76] Inventor: Dale B. Myers, 495 Sierra Madre Villa Ave., Pasadena, Calif. 91107

[21] Appl. No.: 821,423

[22] Filed: Jan. 15, 1992

[51] Int. Cl.$^5$ .............................................. B23K 3/02
[52] U.S. Cl. ......................................... 228/54; 228/55
[58] Field of Search ..................... 228/51, 54, 55, 248, 228/242; 219/221, 530; 419/8, 9, 27, 47

[56] References Cited

U.S. PATENT DOCUMENTS

| | | | |
|---|---|---|---|
| 399,387 | 3/1889 | Dolan | 228/54 |
| 1,602,266 | 10/1926 | Jarkovsky | 219/229 X |
| 1,760,519 | 5/1930 | Palmer | 228/55 X |
| 2,534,257 | 12/1950 | Flournoy | 219/378 X |
| 2,584,999 | 2/1952 | Flournoy | 219/230 X |
| 2,679,223 | 5/1954 | Franklin | 219/230 X |
| 3,153,279 | 10/1964 | Chessin | 419/27 |
| 3,157,143 | 11/1964 | Van Embden | 228/54 |
| 3,439,857 | 4/1969 | Bennett | 228/54 |
| 3,580,462 | 5/1971 | Vanyi | 219/230 X |
| 3,651,306 | 3/1972 | Glyptis | 228/55 X |
| 3,808,659 | 5/1974 | Alger, Jr. et al. | 419/27 |
| 3,917,147 | 11/1975 | Vanyi | 219/230 X |
| 3,948,429 | 4/1976 | Davies et al. | 228/44.7 |
| 4,606,884 | 8/1986 | Gavinet et al. | 419/27 |
| 5,027,518 | 6/1991 | Suzuki et al. | 419/27 |

FOREIGN PATENT DOCUMENTS

| | | | |
|---|---|---|---|
| 235208 | 4/1986 | German Democratic Rep. | 228/54 |
| 624739 | 8/1978 | U.S.S.R. | 228/54 |

OTHER PUBLICATIONS

"Conformal Solder-Desolder Iron", R. Babuka, IBM Technical Disclosure Bulletin, vol. 13 No. 2, Jul. 1970, p. 446.

*Primary Examiner*—Samuel M. Heinrich

[57] ABSTRACT

Latent heat of fusion is used to store and extract a relatively large quantity of temperature controlled heat from the small volume of a soldering iron tip. This is accomplished by fabricating the tip from a composite material comprised of a porous metal matrix, the interstices of which have been filled with an element or alloy having a melting temperature at or near a desired working point. The latent heat of fusion associated with the change of state of this working substance provides a constant temperature reservoir of heat immediately adjacent to a heat consuming operation such as solder joint formation. This proximity of heat source and sink allows the formation of a series of solder joints with only minor tool temperature variation from one to the next, thereby contributing to a uniformity among them that is considered desirable. Also disclosed are appurtenances, fashioned from the same composite materials, that when appended to conducively shaped conventional tools invest them with much of the advantage just described.

16 Claims, 3 Drawing Sheets

COMPOSITE SOLDERING IRON TIP USING HEAT OF FUSION

BACKGROUND OF THE INVENTION

1. Field of the Invention

This invention relates to the use of the latent heat of fusion of a substance to store a relatively large quantity of isothermal heat energy very near a heating tool's point of contact with a workpiece, thereby stabilizing the temperature of the tool while it heats the work. More specifically, it relates to replaceable soldering iron tips that contain a fusible substance within a porous metal matrix.

2. Description of the Prior Art

A manual soldering or desoldering operation commonly consists of bringing a heated tool into contact with one or more of the surfaces to be joined or separated, holding this contact until enough heat has been delivered to the workpiece(s) to raise the surface temperature(s) thereof above the melting point of an appropriate solder alloy, and then applying (or removing) said alloy to (or from) these surfaces.

The heated tool typically idles at an equilibrium temperature established by the balance between the power input to the heating element and the heat dissipated from the apparatus due to free air convection. More sophisticated apparatus will employ the output of a temperature sensing transducer associated with the heated tool to control the power generated by the heating element. In any event, the temperature at the working surface of the heated tool drops rapidly when it is brought into contact with the workpiece. The workpiece, being initially at a much lower temperature, acts as a sink for the heat stored in the heated tool. The replenishment of this stored heat is through a relatively long and complex conductive path from the heating element, and typically involves time lags and temperature drops that are not only immoderately large, but are also ill-defined and poorly controlled.

For the circumstances most germane to this invention, the heated tool is a replaceable soldering iron tip, the surfaces to be joined or separated are parts of an electric or electronic circuit, and the primary function of the joint is to complete an electrically conductive junction between circuit elements. Since an electric or electronic apparatus can be no more reliable than its interconnection network, the fact that manually made solder joints are among the most frequent points of failure has let to the most intense scrutiny of the conditions under which they are formed. The uncertainties stemming from the poorly controlled time lags and temperature drops noted above are intensified by the typical hand soldering process wherein a series of solder joints are made in rapid succession. The progressive drop in soldering iron tip temperature must necessarily render the formation conditions of each solder joint different from the next. A brief treatment of these progressive temperature drops is attempted on page 293 of Howard Manko's definitive book *Solders and Soldering*, second edition, but its very brevity points up the neglect of this important issue, and even the illustrative figure is seriously flawed. The only prior art known to the Inventor that addresses this situation is the simple and obvious expedient of increasing the thermal mass of the soldering iron tip by increasing its size, an approach typified by the "Power Boost" line of tips offered by Hexacon Electric Company of Roselle Park, N.J. This use of the specific heat capacity of the tip material to store and release heat energy is effective only to the extent that it reduces, in rough proportion to the increase in mass of the tip, the temperature drops resulting from a given operation.

The ideal soldering iron tip would maintain a fixed temperature at the point of contact with the workpiece while delivering an unlimited amount of heat at a rate determined only by the physical specifics of the workpiece.

It is a primary object of this invention to provide a replaceable soldering iron tip having an unusually high heat capacity at a stable temperature, thereby providing the means to restrain the temperature excursions, including the progressive temperature drops described above, that contribute to solder joint variations.

SUMMARY OF THE INVENTION

This object is accomplished through the use of the latent heat of fusion of a substance to store, within the small volume of a soldering iron tip, a much larger quantity of heat than would otherwise be available. The latent heat of fusion of a substance is the quantity of heat required to melt a given mass of that substance at its melting temperature, or that is given up by the substance as it solidifies, and is a relatively large quantity compared to that required for most small temperature changes. A temperature variation of one degree that involves this change of state (melting or freezing) typically requires the transfer of more than one hundred times as much heat as does a temperature variation of one degree that does not involve such a change.

The novelty of the present invention resides largely in the combination of a fusible substance, selected for its melting temperature and heat of fusion, with a thermally conductive matrix that contains the fusible substance and provides the primary transfer path for the latent heat associated with changes of state.

A soldering iron tip, or an attachment thereto such as an encircling band or collar, is fabricated from a composite material consisting of a porous and thermally conductive matrix, such as sintered bronze, the interstices of which are filled with a substance having a melting temperature near the desired working temperature of the tool. One such substance might be the 97% zinc, 3% magnesium eutectic alloy that melts at 367 degrees centigrade (about 691 degrees Fahrenheit). In operation, the heating element of the soldering iron heats the tip until the fusible substance melts. The molten substance is retained within the solid matrix by capillarity, and by an overlying shell if one exists. When the tip is applied to a workpiece, heat is drawn from the molten substance and flows through the conductive matrix and the enclosing shell to the workpiece. Because the distance is small, the temperature drop required to sustain this flow is small. The molten substance is a constant temperature reservoir of heat capable of delivering, with little or no temperature change, the energy requirements of a multiplicity of successive solder joint formations. It supplies this energy by giving up its latent heat of fusion in the course of solidifying. Only after substantially all the fusible substance has solidified is there a shift to the rapid temperature drop seen in ordinary tools. A moderate period of idling will allow the heating element to remelt the substance, thereby restoring the reservoir.

BRIEF DESCRIPTION OF THE DRAWINGS

A better understanding of the present invention may be had from a consideration of the detailed description to follow, taken in conjunction with the accompanying drawings, in which:

FIGS. 1A, B, C, & D depict a preferred embodiment at several stages of fabrication, wherein FIG. 1A represents a block of porous, thermally conductive material, the starting point for most embodiments;

FIGS. 3A, B, C, and D are enlarged cross-sectional views taken along a line substantially corresponding to line 3—3 of FIG. 2, wherein FIG. 3A illustrates a conductive matrix comprised of a sintered agglomeration of metallic particles;

DESCRIPTION OF PREFERRED EMBODIMENTS

The preferred embodiment to be presented next is described as the end result of a sequence of formative operations and/or processes. Said sequence has been selected for its illustrative clarity, and is not necessarily representative of the actual fabrication process, which could take many alternative forms.

Figure 1A:
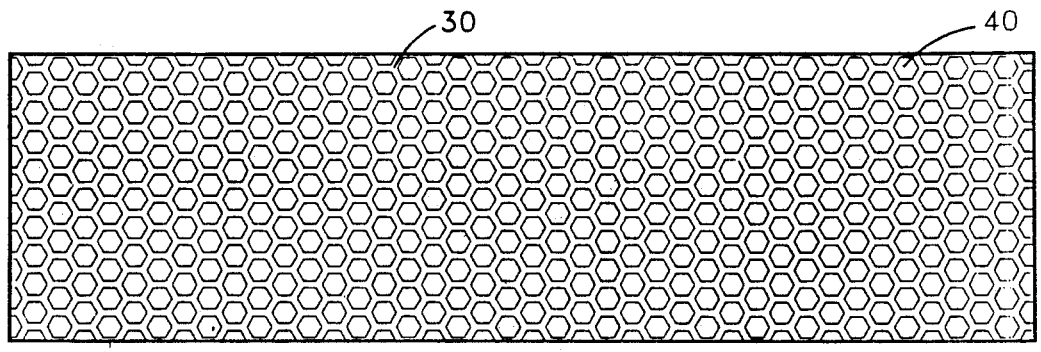

Referring now to FIG. 1A, a longitudinal cross section of a cylinder 10 of the porous conductive matrix is shown symbolically. The honeycomb pattern 30 represents the solid material of the matrix, while the individual hexagons 40 represent the voids within it. The finestructure of an actual cylinder is not likely to resemble this depiction, but could take a great variety of forms, several of which will be described presently. In the realization of these structures, the total volume of void is commonly on the order of half the volume of the cylindrical stock, resulting in a porous matrix having a density frequently expressed as 50%, meaning that it has fifty percent of the mass of an equal volume of the completely solid material. Although a density of around 50% is common, and will for descriptive purposes to regarded as the density of choice, densities ranging from less that 40% to greater than 80% are readily achievable and usable. Very low density metal foams (20% to less than 5%), while not an optimum choice for the present embodiment, are nevertheless obvious compositions to be included within the spirit and scope of this disclosure.

Figure 1B:
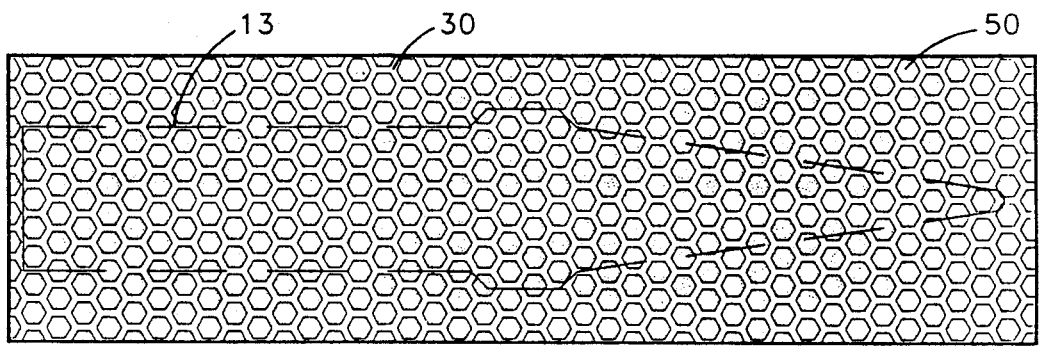
FIG. 1B portrays the voids of the conductive matrix of FIG. 1A filled with a fusible substance, resulting in a composite feedstock that is the core of this invention.

In FIG. 1B, the voids or interstices within the matrix 30 symbolized by FIG. 1A have been filled with the fusible substance of choice, represented by the shaded hexagonal areas 50 of the drawing. The physical properties of zincous alloys will assure their prominent occurrence among the compositions selected for this purpose, but there are many other possible options, one of which is elemental lead. The process by which the interstices of the matrix are filled is also optional, although capillary attraction is one obvious possibility, and vacuum impregnation is another. Once filled, the resulting cylinder 12 of composite material can become feedstock for various machine tools capable of shaping it to a desired form. The profile of one such form is represented by the broken lines 13 on the drawing.

Figure 1C:
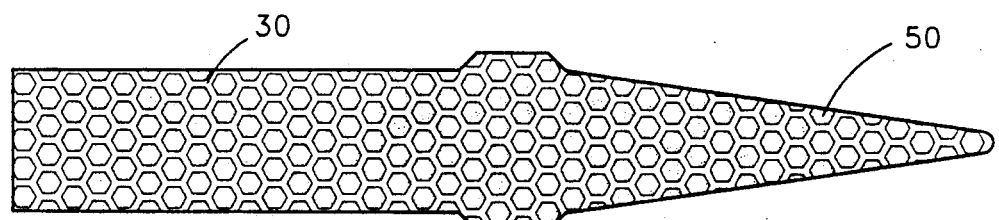
FIG. 1C is a schematic illustration of the cross-section of an unfinished tool fashioned from the feedstock of FIG. 1B.

FIG. 1C depicts a cross sectional view of the end result 14 of a shaping operation, such as might be performed by a screw machine, that brings the part near to its final form and prepares it for any of several finishing processes.

Figure 1D:
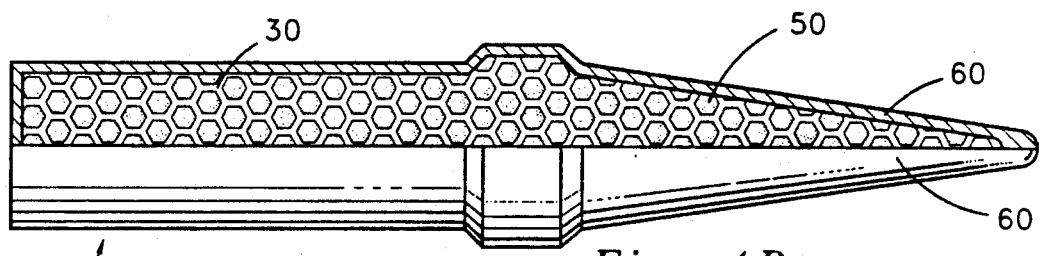
FIG. 1D pictures a finished part, complete with enclosing shell, but with a cutaway allowing the symbolic display of the composite material of the interior.

With the addition of an enclosing overlay 60, the finished part 16 shown with a symbolic cutaway in FIG. 1D can be seen to resemble a familiar type of soldering iron tip. Of course, the essence of this invention is such that it can and will take many other forms. The overlay 60, which might be created by one or more electroless and/or electrolytic plating operations, consists of a shell comprised of materials selected largely for their resistance to the corrosive effects of molten metals and for favorable manufacturing economics. Nickel is one such material and iron is another.

Although this overlay 60 plays some role in containing the working fluid (i.e. the molten zincous alloy or other fused substance 50 within the matrix 30), its main function is to form a physical barrier between that fluid and the solder that is reflowed by the fluid's heat during the formation of a joint. Without the barrier, some intermixing of the materials might occur, with deleterious effects on important properties of each.

Figure 2:
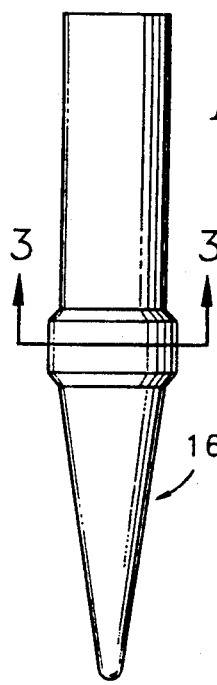
FIG. 2 is a side elevation exterior view of a typical soldering iron tip resulting from the sequence of FIG. 1.

The soldering iron tip 16 of FIG. 2 could, as previously remarked, have any of a very large variety of interior structures. Several of these possibilities are depicted in FIG. 3 by the enlarged cross-sectional views taken along a line substantially corresponding to line 3—3 of FIG. 2.

Figure 3A:
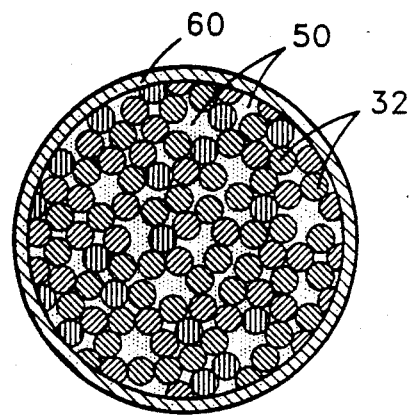

Among the simplest variants is the composition shown in FIG. 3A, wherein an agglomeration of metallic particles 32, sintered together by a process like that used for preparing filters made of sintered bronze, is infused with the selected fusible substance 50. After shaping, the part is completed by the addition of the overlying shell 60, as noted in the description of FIG. 1D, above.

Figure 3B:
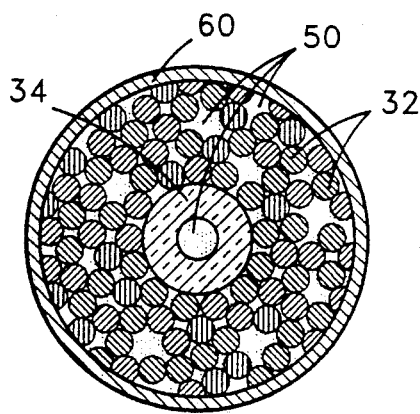
FIG. 3B shows a conductive matrix consisting of a combination of metallic particles sintered together around a thick-walled, centrally located metal tube.

FIG. 3B illustrates a simple addition to the approach just described, that will improve thermal conductivity near the point of the soldering iron tip. A central metal tube 34 is surrounded by a mass of sintered particles 32, and all the interstices are filled with the fusible substance 50. The overlying shell 60 completes the part.

Figure 3D:
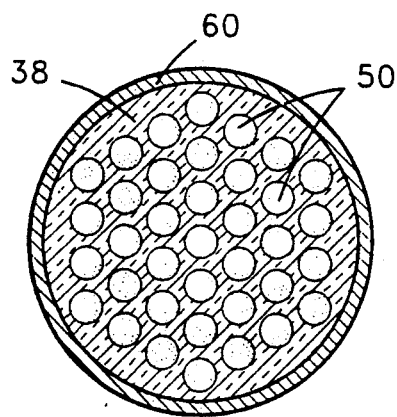
FIG. 3D exhibits a conductive matrix embodied by a rod having a multiplicity of elongate internal passages, or bores, distributed axially through its volume.
Figure 3C:
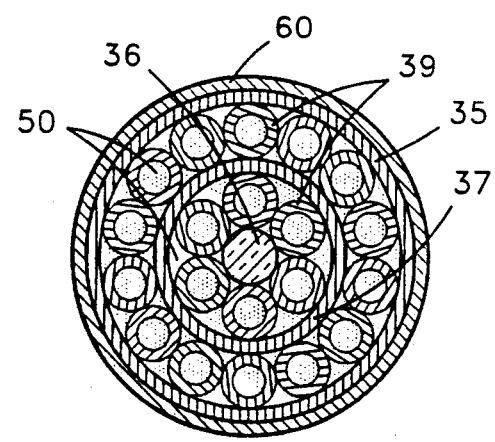
FIG. 3C details a conductive matrix formed from an aggregation of rods and tubes ensleeved by larger tubes.

The more complex variant shown in FIG. 3C is comprised of an assemblage of metal rods 36 and small diameter tubes 39, bundled together and ensleeved by larger diameter tubes 35 & 37, wherein the voids consisting of the hollow portion of the tubes together with the longitudinal interstices between the parallel components are filled with the fusible substance 50. As before, the overlying shell 60 completes the structure. The thermal conductivity of this variant will generally be greater than that of the sintered part of FIG. 3A.

A variant having superior thermal conductivity owing to its minimization of the interstitial boundaries that impede heat flow is shown in FIG. 3D. It consists of a copper rod 38 having a plurality of elongate internal passages, or bores, distributed axially through its volume and filled with a fusible substance 50. The overlying shell 60 is the finish applied to the part shaped from this composite structure.

Figure 4:
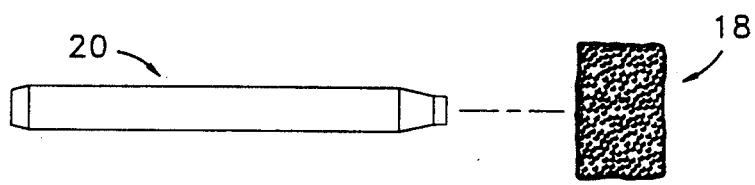
FIG. 4 is an exploded view of another embodiment wherein a disk of composite material is to be appended to a conventional soldering iron tip.
Figure 5:
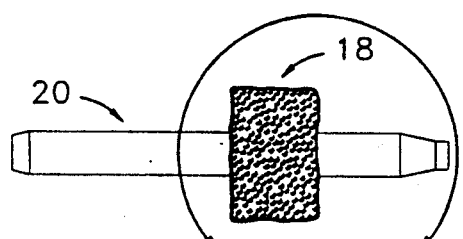
FIG. 5 shows the disk of FIG. 4 emplaced on the conventional tip.
Figure 6:
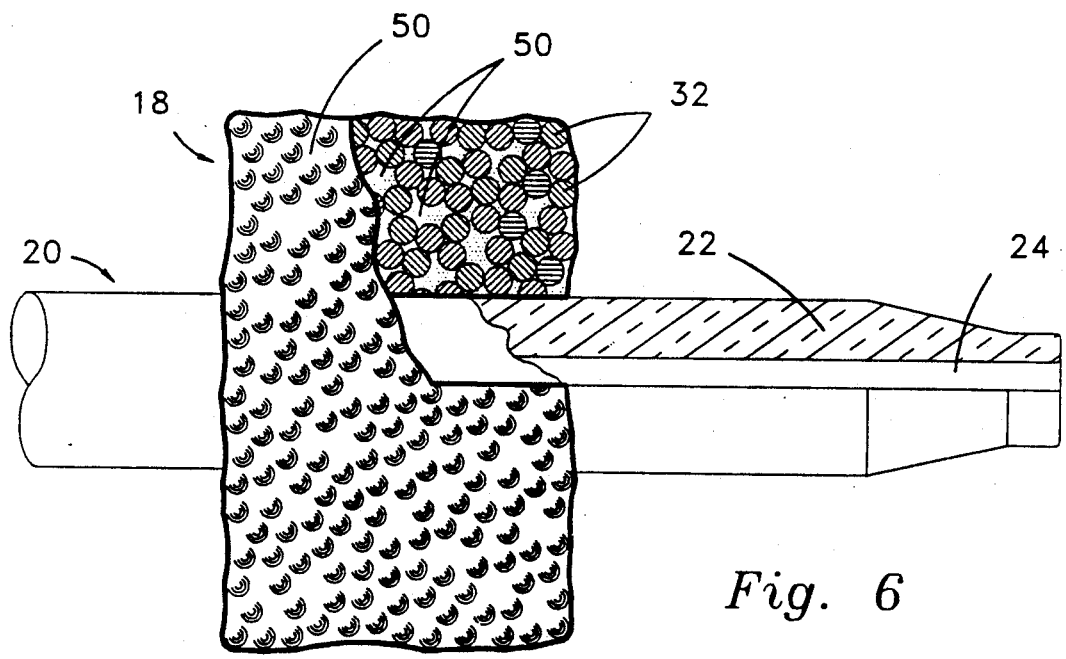
FIG. 6 is a greatly enlarged, partly cutaway view corresponding to arc 6—6 of FIG. 5, wherein the conventional tip is revealed to be a hollow desoldering iron tip, and the conductive matrix of the composite disk consists of sintered particles.

Another preferred embodiment, which provides for the attachment to conventional tools of appurtenances fashioned from these same composite structures, is depicted in FIGS. 4, 5, and 6.

FIG. 4 is an exploded view of this embodiment wherein a disk 18 of composite material is to be appended to a conventional soldering iron tip 20. In FIG. 5, the disk 18 has been emplaced on the conventional tip 20 by a light interference press fit, or other suitable means.

FIG. 6 is a greatly enlarged, partly cutaway view corresponding to arc 6—6 of FIG. 5, wherein the conventional tip 20 is revealed to be a hollow desoldering iron tip formed from a thick-walled metal tube 22 with a central passage 24 through which molten solder can be drawn. Pace, Inc. of Laurel, Md. is a prominent source of desoldering iron tips of this sort, as well as of the apparatus that uses them. The attached appurtenance 18 is, in this instance, comprised of a thermally conductive matrix of metal particles 32 sintered together, the interstices of the resulting porous mass having been filled with a fusible substance 50. The structure is similar to that exhibited in FIG. 3A, but without the overlying shell 60. Said shell is superfluous in this embodiment because the appurtenance is not intended to come into contact with the workpiece, but is instead confined to exchanging heat with the conventional tip 20, which conducts the heat to the workpiece. For experimental and modeling purposes, I have obtained similar disks of sintered bronze from Thermet-Krebsöge, Inc. of Gloucester, Mass.

OPERATION AND ADVANTAGES

Several structures for the porous, thermally conductive matrix have been suggested. For each variant, as well as for the many other possibilities not detailed here, the operating principle is the same. The heating element of the soldering iron heats the composite soldering iron tip 16 until the fusible substance 50 melts. When the tip is then applied to a workpiece, heat is drawn from the molten substance 50 and flows through the conductive matrix identified as items 30, 32, 34, 35, 36, 37, 38 & 39 in the various Figures, and through the enclosing shell 60 to the workpiece. The molten substance 50 is an isothermal reservoir of heat capable of supplying, with little or no temperature change, the energy needed to make a multiplicity of successive solder joint formations. It delivers this energy by giving up its latent heat of fusion in the course of solidifying.

Only after substantially all the fusible substance has solidified is there a shift to the rapid temperature drop seen in ordinary tools. A moderate period of idling will allow the substance to be remelted, thereby restoring the reservoir. Since there is always a brief idling period between joint formations, this invention could be likened to a "thermal flywheel".

If the conductive matrix has approximately 50% void, the composite soldering iron tip 16 depicted in FIGS. 1D and 2 would contain roughly one fifth of a cubic centimeter of the fusible substance 50. This quantity of the 97% zinc, 3% magnesium eutectic alloy that melts at 691° F. would store about 30 calories as heat of fusion. The formation of a typical soldered connection at the lead of an electronic component might require something on the order of 1½ calories, a quantity derived over pages 277 and 278 of Howard Manko's book *Solders and Soldering*, second edition. It follows that a composite soldering iron tip of this construction has the capacity to make around 20 solder joints in rapid succession with practically no change in tool temperature. In contrast, the extraction of the same 30 calories of heat from the specific heat capacity of a conventional solid copper tip of this size could result in a temperature drop of nearly 200 Fahrenheit degrees!

As previously remarked, the novelty of this invention resides largely in the combination of a fusible substance with a thermally conductive matrix. The small dimensions of the interstices of the conductive matrix ensure that the entire volume of the fusible substance, which may be on the order of half the volume of the tool or appurtenance, is within a hundredth of an inch or so of a good thermal conductor, thereby insuring that the temperature drop involved in transferring heat of fusion from the fusible substance to the conductive matrix is always small. As a result, the temperature of the tool tends to be stabilized very near the transition temperature of this fusible substance.

Another salutary consequence of the high surface-to-volume ratio of the molten substance is the fact that surface tension forces then dominate gravitational forces, thereby inhibiting the phenomenon of free convection. Without the circulation driven by free convection, a thin stagnant layer of fluid along the surfaces of the surrounding matrix becomes saturated with the metal of which the matrix is formed, thereby reducing the rate at which that metal is dissolved by the molten substance. The useful life of the tool may then be less reliant upon the integrity of some relatively insoluble barrier layer, commonly nickel, at the surface of the metal matrix.

SCOPE

The above description of preferred embodiments has suggested a variety of materials and processes. It will be appreciated that there is a very large body of alloying and metalforming art and science, only a tiny fraction of which is known to the Inventor, that can be brought to bear on the detailed implementation of one or another embodiment of the invention, and that would be considered obvious to persons skilled in those arts. One prominent example is the matter of relatively insoluble barrier layers that, for practical purposes, may be required at the surfaces of the conductive matrix for some combinations of matrix material and fusible substance. The combination of a copper matrix with fusible lead probably has little need for such a barrier, whereas the combination of copper with pure zinc could well rely upon it to inhibit the formation of brass. The issue is given only cursory mention here, partly because the subject far outstrips the Inventors knowledge of it, but primarily because it is not central to the present invention, and has little bearing on the novelty thereof.

Another example of associated but peripheral art is the temperature monitoring means to which the configuration of composite soldering iron tips may be adapted. The exceptionally high thermal inertia of such a tip, from which it obtains its special utility and which is the foundation of this disclosure, is seen only at the melting temperature of the fusible substance contained within it. It follows that the present invention will be most advantageous when used with solder-working apparatus having the means to seek that temperature. Many existing soldering instruments rely upon contact between the tip and a thermistor or thermocouple, and one widely used iron (the "Magnastat" system made by Weller, of Apex, N.C.) employs the Curie point of a nickel-iron appurtenance attached to the base of the tip. Composite soldering iron tips suggested by this disclosure are, of course, readily adaptable to the various temperature control means found in existing apparatus.

The materials, processes, and structures set forth in this description are only appropriate examples of many possibilities and as such do not define the limits of this invention. While two preferred embodiments of the present invention have been disclosed in detail, it is apparent that modifications and adaptations of that invention will occur to those skilled in the art. It is to be expressly understood that such modifications and adaptations are within the spirit and scope of the present invention as set forth in the following claims.

What is claimed is:

1. A means for using the latent heat of fusion of a material as a proximate reservoir of isothermal heat to provide, with only minor deviations from the fusion temperature, the energy necessary to perform a series of soldering operations, such means being characterized by the application of an implement comprised of
   (a) a porous matrix of thermally conductive material that constitutes the primary path of conductive heat transfer, and provides the containment for
   (b) a mass of fusible material, distributed throughout the interstices of the conductive matrix, and having a fusion temperature substantially in the range of 50° F. to 500° F. higher than the melting point of the solder used in the soldering operation, that when cycled over a narrow temperature range including the fusion temperature, melts and solidifies, and in the process absorbs and releases, respectively, a quantity of heat large with respect to cycles that do not include such a change of state, and
   (c) a means, such as an overlying metallic shell, of establishing a physical barrier between said fusible material and the solder involved in the soldering operation.

2. The means of claim 1 wherein said porous matrix of thermally conductive material is comprised of a sintered agglomeration of metallic particles.

3. The means of claim 1 wherein said porous matrix of thermally conductive material is comprised of an aggregation of solid metallic members selected from the group consisting of tubes and rods, said aggregation being bound together by any suitable means, one of which is sintering.

4. The means of claim 1 wherein said porous matrix of thermally conductive material is comprised of a combination of metallic particles sintered together with at least one solid metallic member selected from the group consisting of tubes and rods.

5. The means of claim 1 wherein said porous matrix of thermally conductive material is comprised of an elongated solid metallic member, said member having a multiplicity of elongate passages, often referred to as bores, distributed axially through its volume.

6. A tool that employs the latent heat of fusion of a substance as a proximate reservoir of isothermal heat to provide, with only minor deviations from the fusion temperature, the energy necessary to perform a series of soldering operations, said tool being comprised of
   (a) an adaptively shaped and formed porous matrix of thermally conductive material that constitutes the primary path of conductive heat transfer, and provides the containment for
   (b) a mass of fusible material, distributed throughout the interstices of the conductive matrix, and having a fusion temperature substantially in the range of 50° F. to 500° F. higher than the melting point of the solder used in the soldering operation, that when cycled over a narrow temperature range including the fusion temperature, melts and solidifies, and in the process absorbs and releases, respectively, a quantity of heat large with respect to cycles that do not include such a change of state, and
   (c) a means, such as an overlying metallic shell, of establishing a physical barrier between said fusible material and the solder involved in the soldering operation.

7. The tool of claim 6 wherein said porous matrix of thermally conductive material is comprised of a sintered agglomeration of metallic particles.

8. The tool of claim 6 wherein said porous matrix of thermally conductive material is comprised of an aggregation of solid metallic members selected from the group consisting of tubes and rods, said aggregation being bound together by any suitable means, one of which is sintering.

9. The tool of claim 6 wherein said porous matrix of thermally conductive material is comprised of a combination of metallic particles sintered together with at least one solid metallic member selected from the group consisting of tubes and rods.

10. The tool of claim 6 wherein said porous matrix of thermally conductive material is comprised of an elongated solid metallic member, said member having a multiplicity of elongate passages, often referred to as bores, distributed axially through its volume.

11. A replaceable soldering iron tip fabricated from a composite material structure that employs the latent heat of fusion of a substance as a proximate reservoir of isothermal heat to provide, with only minor deviations from the fusion temperature, the energy necessary to perform a series of soldering operations, said soldering iron tip being comprised of
   (a) an adaptively shaped and formed porous matrix of thermally conductive material that constitutes the primary path of conductive heat transfer, and provides the containment for
   (b) a mass of fusible material, distributed throughout the interstices of the conductive matrix, and having a fusion temperature substantially in the range of 50° F. to 500° F. higher than the melting point of the solder used in the soldering operation, that when cycled over a narrow temperature range including the fusion temperature, melts and solidifies, and in the process absorbs and releases, respectively, a quantity of heat large with respect to cycles that do not include such a change of state, and (c) a means, such as an overlying metallic shell, of establishing a physical barrier between said fusible material and the solder involved in the soldering operation.

12. The soldering iron tip of claim 11 wherein said porous matrix of thermally conductive material is comprised of a sintered agglomeration of metallic particles.

13. The soldering iron tip of claim 11 wherein said porous matrix of thermally conductive material is comprised of an aggregation of solid metallic members selected from the group consisting of tubes and rods, said aggregation being bound together by any suitable means, one of which is sintering.

14. The soldering iron tip of claim 11 wherein said porous matrix of thermally conductive material is comprised of a combination of metallic particles sintered together with at least one solid metallic member selected from the group consisting of tubes and rods.

15. The soldering iron tip of claim 11 wherein said porous matrix of thermally conductive material is comprised of an elongated solid metallic member, said member having a multiplicity of elongate passages, often referred to as bores, distributed axially through its volume.

16. Appurtenances, fabricated from a composite material structure, that when appended to a conventional tip for solder working apparatus, invests said tip with the capacity to employ the latent heat of fusion of a substance as a proximate reservoir of isothermal heat to provide, with only minor deviations from the fusion temperature, the energy necessary to perform a series of solder working operations, said appurtenances being comprised of (a) an adaptively shaped and formed porous matrix of thermally conductive material that constitutes the primary path of conductive heat transfer, and provides the containment for (b) a mass of fusible material, distributed throughout the interstices of the conductive matrix, and having a fusion temperature substantially in the range of 50° F. to 500° F. higher than the melting point of the solder used in the solder working operation, that when cycled over a narrow temperature range including the fusion temperature, melts and solidifies, and in the process absorbs and releases, respectively, a quantity of heat large with respect to cycles that do not include such a change of state, and (c) a means, such as an overlying metallic shell and/or physical isolation, of establishing a physical barrier between said fusible material and the solder involved in the solder working operation.

* * * * *